Figure 1:
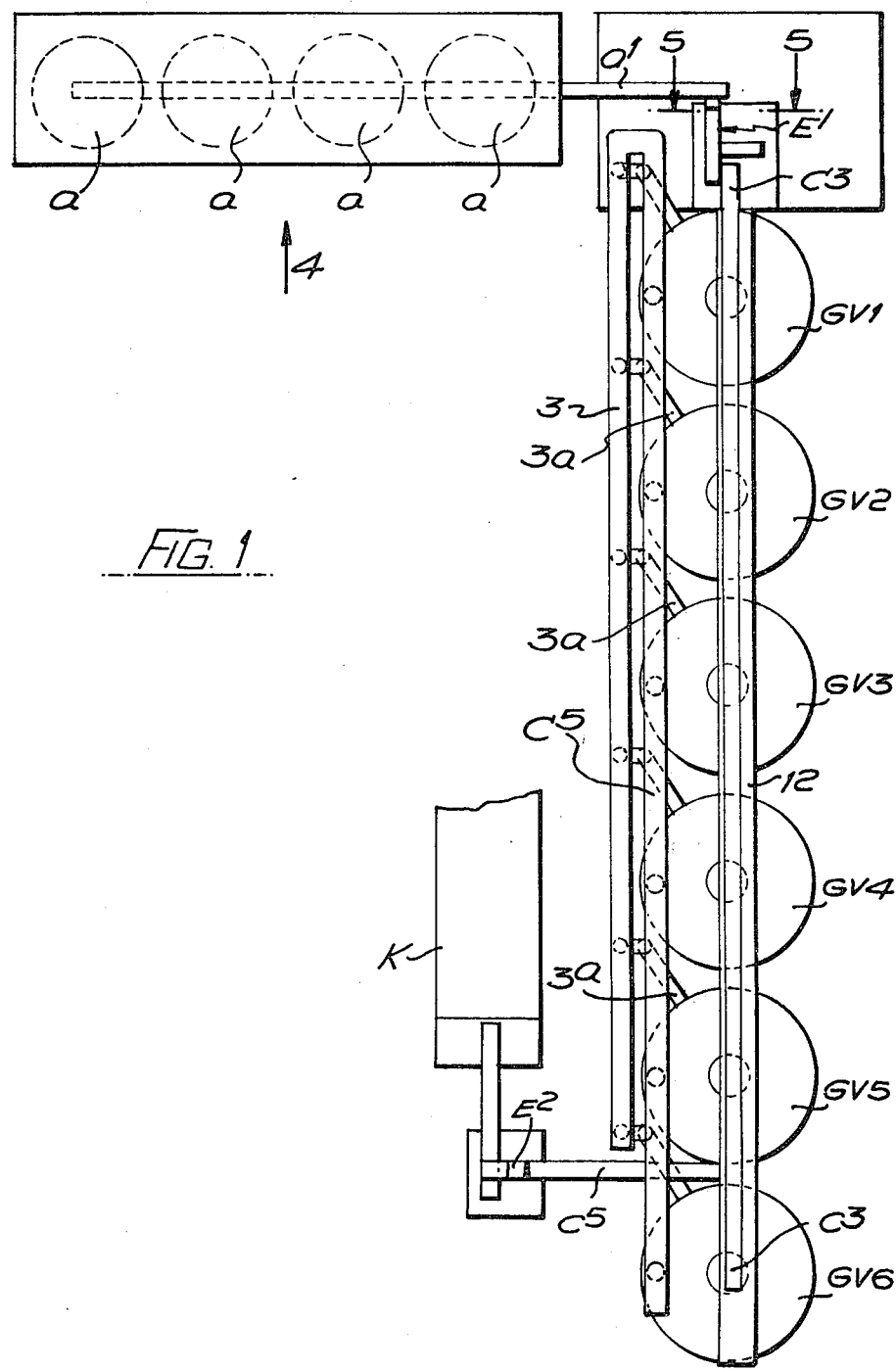

United States Patent [19]

Simpson

[11] 4,277,505

[45] Jul. 7, 1981

[54] PROCESS FOR THE MALTING OF GRAIN

[75] Inventor: Simon B. Simpson, Berwick Upon Tweed, England

[73] Assignee: J. P. Simpson and Co. (ALNWICK) Limited, Berwick Upon Tweed, England

[21] Appl. No.: 5,606

[22] Filed: Jan. 22, 1979

[30] Foreign Application Priority Data

Apr. 21, 1978 [GB] United Kingdom ............... 15799/78

[51] Int. Cl.$^3$ .............................................. C12C 1/04
[52] U.S. Cl. ....................................... 426/64; 99/278; 435/185; 435/302; 435/304; 435/305
[58] Field of Search .................... 426/28, 64; 435/302, 435/304, 305, 306, 185; 99/276, 278

[56] References Cited

U.S. PATENT DOCUMENTS

| | | | |
|---|---|---|---|
| 409,956 | 8/1889 | Gent | 435/304 |
| 481,958 | 9/1892 | Krause | 435/304 |
| 2,998,351 | 8/1961 | Stoddart et al. | 435/302 X |
| 3,616,261 | 10/1971 | Leue et al. | 99/278 X |

*Primary Examiner*—David M. Naff
*Attorney, Agent, or Firm*—Norris & Bateman

[57] ABSTRACT

Germination of cereal grain in malting is carried out by passing steeped grain to and through a series of six closed spaced discrete vessels in succession. The grain is maintained in each vessel for about a day and in each vessel is subjected to an upward flow of humidified attemperated air. The grain is turned either in a vessel or through transference to the next vessel. Transference from one vessel to the other is carried out by discharging the grain from each vessel along a lower conveyor to an elevator which raises the grain to an upper conveyor that discharges the grain down into the next vessel. Grain leaves the last vessel of the series as green malt and then passes to a malt kiln where it is dried to a desired moisture level.

2 Claims, 5 Drawing Figures

PROCESS FOR THE MALTING OF GRAIN

This invention relates to an improved process for the germination of grain in malting.

In the malting process cereal grain, usually barley is subjected to three operations:
(a) Steeping by immersion in water or spraying the water onto the grain or a combination of the two until the required moisture content of the grain is reached.
(b) Germination where developing grain is subjected to a flow of humidified attemperated air over a period of time until the developing grain reaches the desired point of modification.
(c) Kilning-when the grain is dried to the required moisture level of the final product.

According to the invention, a process for the germination of cereal grain comprises passing steeped grain to a plurality of closed germinating vessels arranged in series, allowing the grain to remain in each vessel for 23 hours thereafter, turning the grain either in the vessels or through transference from one vessel to the next, and passing the grain through a planetary discharge unit during each transference from a vessel, the grain finally passing as a green malt into a green malt conveying and elevating system and so to a malt kiln.

Apparatus for carrying out the process comprises a plurality of closed grain germinating vessels arranged in series, conveyors for transferring the grain from vessel to vessel, elevator worms for lifting the grain, a planetary discharge unit in the centre of each vessel comprising a radial screw and a drive motor therefor rotating in each vessel, means for rotating the screw about its axis, a conveying and elevating system and a filn to which the green malt is passed.

Figure 2:
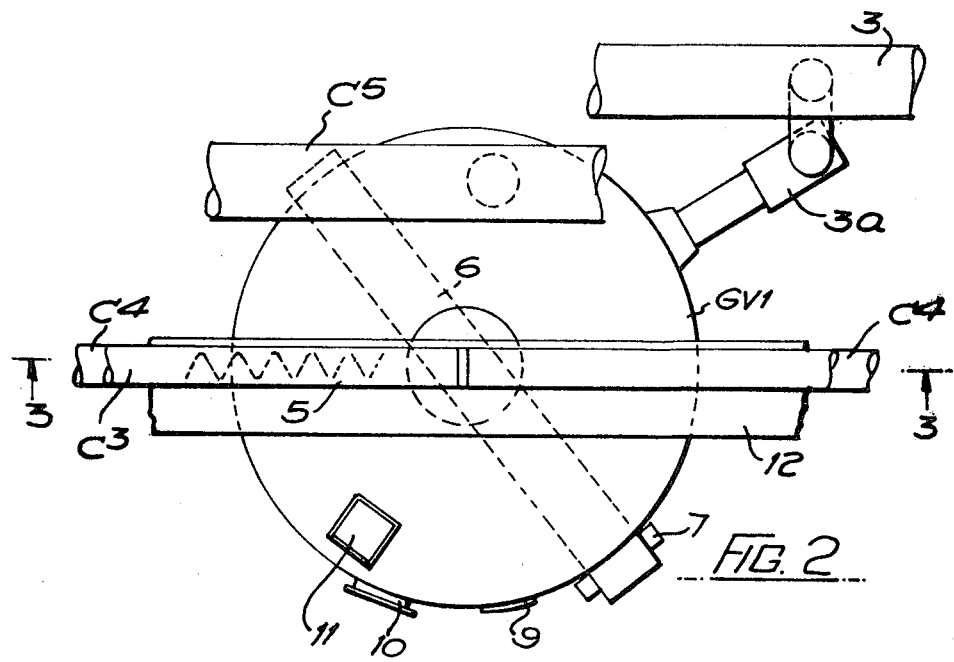
Figure 3:
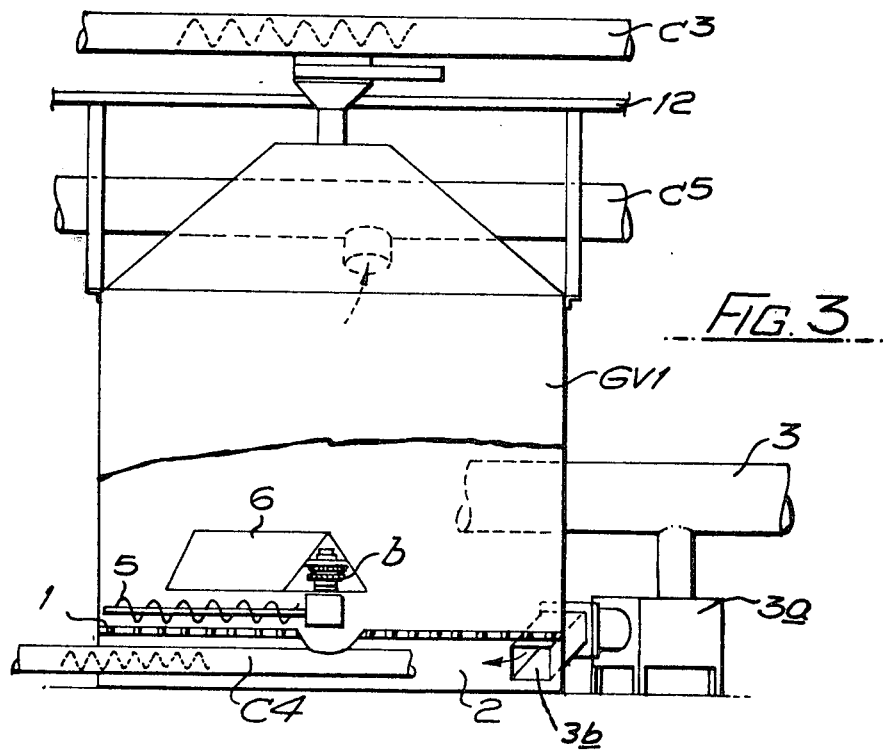
Figure 4:
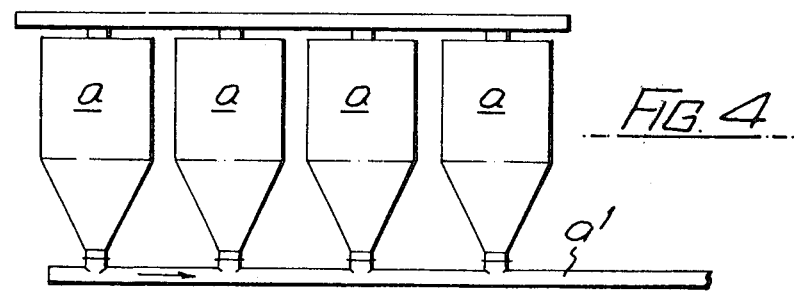
Figure 5:
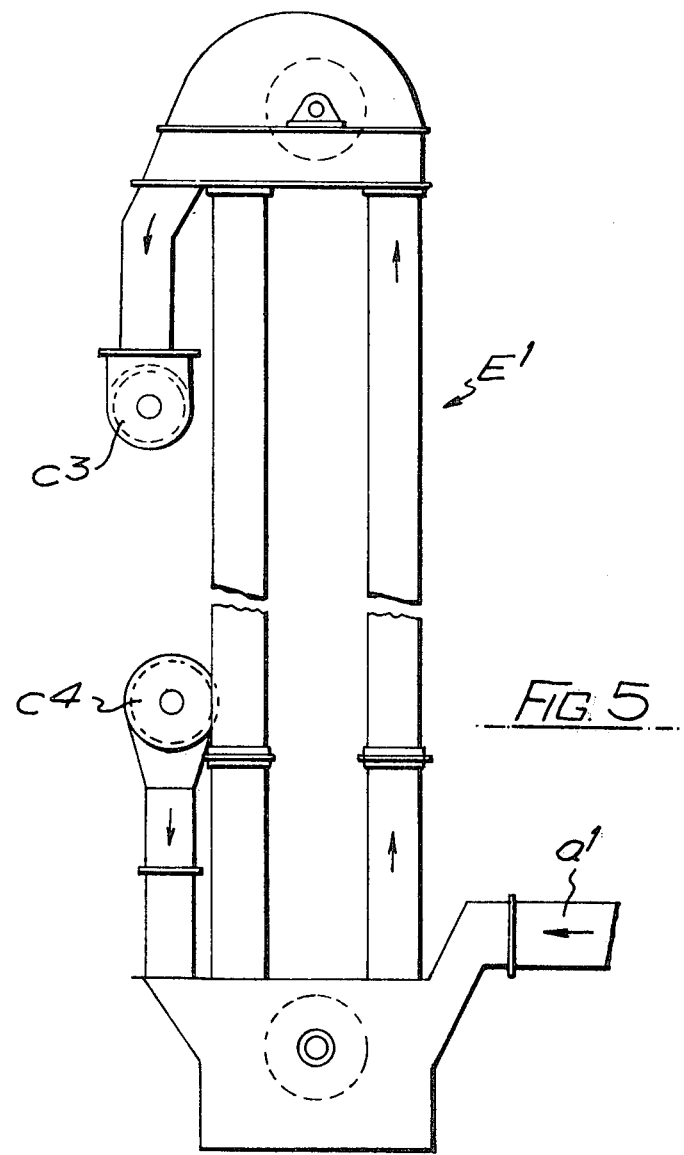

The invention will be described with reference to the accompanying drawings wherein:

FIG. 1 is a diagrammatic plan view of the plant;
FIG. 2 is a plan of a germination vessel to a larger scale;
FIG. 3 is an elevation on line 3—3 FIG. 2;
FIG. 4 is an elevation looking in the direction of arrow 4 in FIG. 1;
FIG. 5 is a section on line 5—5 FIG. 1.

The invention also comprises apparatus for carrying out the process.

The normal steeping takes place in conical steeping vessels a where the steeping time and temperatures are conventional and after two or three days of steeping with the required air rests, containing sufficient moisture to support growth, the soaked grain is transferred by a worm conveyor $a^1$, and elevator E1 to the germinating vessels GV1-GV6.

The steeped grain is elevated by the worm E1 and passes along a screw conveyor C3 to a first germinating vessel GV1. The steeped grain remains in this vessel for 23 hours and the developing grain is then discharged along a central conveyor C4 and once again elevated by the worm E1 and returned along the upper conveyor C3 to a second germination vessel GV2.

This routine continues each working day so that this same batch then passes to a third vessel GV3 and then to a fourth vessel GV4, always advancing in each daily work pattern. The grain remains a further 23 hours in a fifth vessel GV5 before the partially malted grain is transferred for the last time to the final germination vessel GV6. Exhaust escapes through pipes C5' from the top of each vessel.

The grain remains a further 23 hours in a fifth vessel GV5, before the partially malted grain is transferred for the last time to the final germination vessel GV6. It is from this point (six days after the original cast) that the final green malt passes through a planetary discharge unit b (FIG. 3) into a separate green malt system namely comprising a conveyor C5, and elevator E2 to a traditional malt kiln K.

The flat bottomed steel germination vessels GV1-GV6 are of a closed cylinder construction of say six metres in diameter and five metres in height and having a galvanised perforated floor 1 with a plenum chamber 2 below each vessel having its own humidifying and attemperated air supply system 3a with the option of recirculating the saturated air from one or more of the germinating vessels and also warm air can be supplied from the adjacent kilns. Each vessel has its own cleaning system and the cleaning can take place either during germination or after discharge and before refilling.

The partially malted grain is turned by transferring from one closed vessel to another or within its own vessel as and when required. This is made possible by a planetary discharge which feeds a central conveyor loosening the entwined rootlets on the germinating grain and allowing it to pass to the conveyor C4. The planetary discharge unit driving mechanism of known construction is in the centre of each vessel and consists of a drive motor which turns a radial screw 5. The screw turns on its own axis as well as around the centre of the silo bottom. A regular discharge rate is assured by the discharge screw which conveys during each rotation about its own axis a constant volume of germinating grain. Access to the drive mechanism is possible when the vessel is full by way of a triangular horizontal beam 6 running through the middle of the vessel which is of a welded construction and supported at both ends by foundation sockets.

The plenum chamber at the base of each vessel consists of a galvanised perforated floor 1 with the common conveyor C4 dissecting the vessel. This conveyor is effectively sealed off from the plenum chamber itself but humidified air is allowed to pass around the sides of the central conveyor C4.

Humidified attemperated air is drawn by a fan placed at 35° to the central conveyor C4 and at ground level for ease of supervision. The air is drawn from a pipe 3 and passes through the air supply system 3a and through ducts 3b to circulate around the sides of the central conveyor C4. The dished floor allows the conveyor C4 which may be tapered, to completely discharge all the growing grain. Access is provided above and below the apertures 9, 10, 11 for viewing the grain and the common conveying system, and an administrational walkway 12 allows for ease of supervision. The malting system consists of the six germinating vessels corresponding to the number of days required for germination.

A further facility for water uptake should the traditional steeping pattern require further adjustment is allowed for and this can be administered at any point along either of the two central conveyors C3 and C4.

What I claim is:
1. A process for the germination of cereal grain in malting which comprises the steps of passing a quantity of steeped grain in succession to and through a series of six closed spaced discrete vessels, the grain, upon leaving each vessel, discharging along a lower conveyor to an elevator which raises the grain to an upper conveyor that discharges the grain down into the next vessel with the germinating grain remaining in each vessel for about a day before being transferred to the next vessel, subjecting the developing grain in each vessel to upward flow of humidified attemperated air until a desired point of modification of the grain is attained with the grain leaving at last vessel of the series as a green malt, turning the grain either in a respective vessel or through transference to the next vessel and finally passing the grain to a malt kiln where it is dried to a required moisture level.

2. The process defined in claim 1 wherein the grain remains in each vessel twenty-three hours.

* * * * *

UNITED STATES PATENT AND TRADEMARK OFFICE
CERTIFICATE OF CORRECTION

PATENT NO. : 4,277,505
DATED : July 7, 1981
INVENTOR(S) : Simon B. Simpson

It is certified that error appears in the above—identified patent and that said Letters Patent are hereby corrected as shown below:

Column 1, line 36, change "filn" to --kiln--.

Column 4, line 1, change "at" to --the--.

Signed and Sealed this

Twenty-second Day of September 1981

[SEAL]

Attest:

Attesting Officer

GERALD J. MOSSINGHOFF

Commissioner of Patents and Trademarks